E. W. LODGE.
HEADLIGHT SCREEN.
APPLICATION FILED MAR. 30, 1922.

1,430,390. Patented Sept. 26, 1922.

Edwin W. Lodge,
Inventor

By Walter B. Burrow,
Attorney

Patented Sept. 26, 1922.

1,430,390

UNITED STATES PATENT OFFICE.

EDWIN W. LODGE, OF NORFOLK, VIRGINIA, ASSIGNOR OF ONE-FOURTH TO FREDERICK D. COCK, OF HAMPTON, VIRGINIA.

HEADLIGHT SCREEN.

Application filed March 30, 1922. Serial No. 548,052.

*To all whom it may concern:*

Be it known that I, EDWIN W. LODGE, a citizen of the United States, residing at Norfolk, in the county of Norfolk and State of Virginia, have invented certain new and useful Improvements in Headlight Screens, of which the following is a specification.

My invention relates to headlight screens.

The object of the invention is to provide a screen for automobile head lamps whereby the light rays may be thrown downwards upon the road and at the same time, be projected at a certain angle to the right which latter direction, the automobile takes when making turns in a road, street and in avoiding other machines.

Further objects and advantages will be more fully described herein and specifically pointed out in the claim hereunto annexed recourse being had to the accompanying drawing forming a part of this specification in which:

In the drawings like reference numerals indicate similar parts in all the several views.

1 is the outer clamp ring of an automobile head lamp consisting of a circular band having a turned in edge or bead 2 for holding the glass lens and the hereinafter described inner light deflecting ring.

Figure 1:
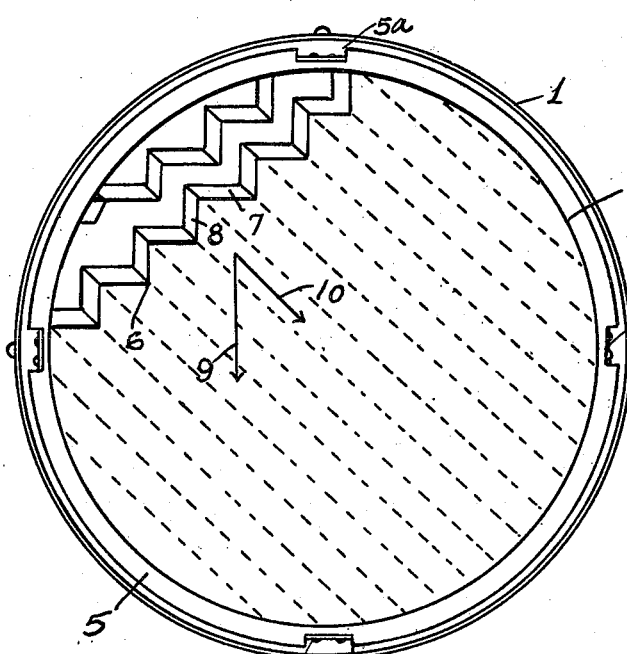
Figure 1 is an inside view of my device applied to the glass holding ring of the usual head lamp.
Figure 3:
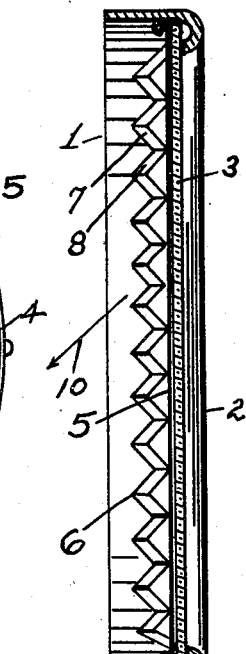
Figure 3 is a cross sectional view.
Figure 2:
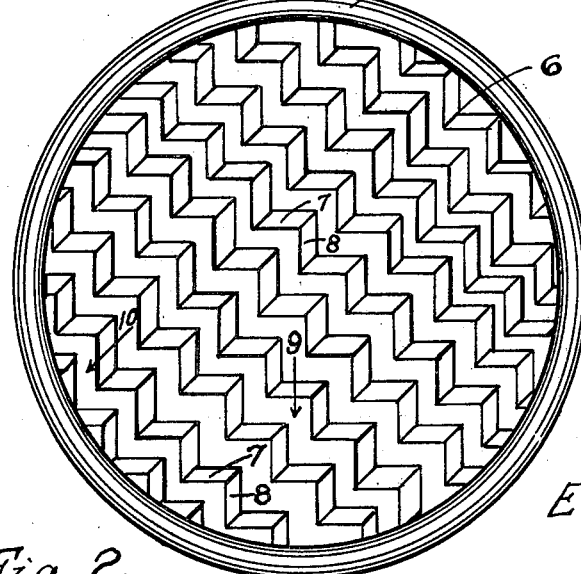
Figure 2 is a front view of the same.
Figure 4:
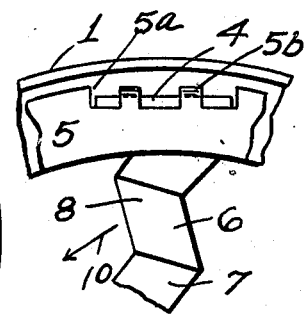
Figure 4 is an enlarged inner view of a fragmentary portion of the outer and inner screen ring showing means for holding the latter to the outer ring.

3 represents the glass plate or lens of the headlamp, (Figure 3).

The ring 1 is provided with tongues 4 for engaging suitable holding means therefor also for securing the hereinafter described ring formed with zig-zag strips which is pertinent to my invention.

The ring 5, which carries and forms a part of the zig-zag strips, shown at 6, is provided with notches $5^a$ and in them are formed the tongues $5^b$ adapted to be bent over the plates or tongues 4 which form a part of the outer ring 1. In this manner, the ring, with its strips 6 are held close to the circular glass plate or lens so that the same may not be altered in its position by jarring.

It will be seen that my device is inside of the ring 1, that is to say, behind the glass 3 and consequently the strips 6 are prevented from being clogged with mud, sleet and snow, besides being prevented from sustaining injury.

The stepped or zig-zag strip members 6 are disposed at an angle of approximately forty-five degrees from the vertical axis and consist of the horizontal portions 7 and vertical parts or risers 8 forming a series of serrations, steps, chevrons or sharp angles and by their form and position project the light beams to the right at the same time permitting the light from the lamp to be thrown downwards as indicated by the arrows 9 and 10.

The notches 5 and tongues $5^b$ adapt my invention to fit lamps on various models of popular makes of automobiles.

I claim:

A headlight screen, and in combination with a supporting rim and its glass or lens, of a ring positioned on the inner side of the said glass having a series of independent strips across the diameter thereof and disposed at an angle each having bends to form steps, said steps having their horizontal and vertical portions at right angles to each other with the apices of the angles in alignment for directing rays of light downwards and at a given angle.

In testimony whereof I have hereunto affixed my signature in the presence of two witnesses.

EDWIN W. LODGE.

Witnesses:
WALTER B. BURROW,
J. B. BAXTER.